United States Patent

Fukumoto et al.

[11] Patent Number: 5,553,900
[45] Date of Patent: Sep. 10, 1996

[54] PIPE JOINT STRUCTURE FOR FLUID DEVICE

[75] Inventors: Toshiyuki Fukumoto, Toyonaka; Kiyoshi Nishio, Takarazuka, both of Japan

[73] Assignee: Nippon Pillar Packing Co., Ltd., Osaka, Japan

[21] Appl. No.: 466,184

[22] Filed: Jun. 6, 1995

Related U.S. Application Data

[63] Continuation of Ser. No. 180,468, Jan. 12, 1994, abandoned, which is a continuation of Ser. No. 803,984, Dec. 9, 1991, abandoned.

[30] Foreign Application Priority Data

Jan. 24, 1991 [JP] Japan ................... 3-006944

[51] Int. Cl.$^6$ .................................................. F16L 25/00
[52] U.S. Cl. ................ 285/331; 285/39; 285/334.2; 285/382.7; 251/148
[58] Field of Search .................... 285/331, 39, 334.2, 285/334.3, 332.4, 382.7; 251/148, 150, 151, 152

[56] References Cited

U.S. PATENT DOCUMENTS

| | | | |
|---|---|---|---|
| 2,344,032 | 3/1944 | Eden | 285/382.7 X |
| 2,389,233 | 11/1945 | Cowles | 285/382.7 X |
| 2,490,620 | 12/1949 | Cole et al. | 285/382.7 X |
| 2,547,889 | 4/1951 | Richardson | 285/332.4 |
| 3,348,570 | 10/1967 | Nealy | 251/151 X |
| 3,378,282 | 4/1968 | Demler, Sr. | 251/148 X |
| 3,499,671 | 3/1970 | Osborne | 285/382.7 X |
| 4,088,350 | 5/1978 | Lee, II | 285/331 X |
| 4,458,878 | 7/1984 | Tsuno | 251/152 |
| 4,848,802 | 7/1989 | Wolf et al. | 285/382.7 |
| 5,152,499 | 10/1992 | Silverman et al. | 251/148 |
| 5,332,271 | 7/1994 | Grant et al. | 285/39 X |

FOREIGN PATENT DOCUMENTS 1122624  4/1982  Canada ................... 285/382.7

*Primary Examiner*—Rodney M. Lindsey
*Attorney, Agent, or Firm*—Jones, Tullar & Cooper, P.C.

[57] ABSTRACT

When used for connecting a fluid carrying pipe, the pipe joint for a fluid handling device of the present invention can provide a strong force for preventing the fluid carrying pipe from coming out from the pipe joint and can assure excellent sealing properties regardless of variations of the fluid temperature. The present pipe joint is arranged such that no fluid stay portion is formed. A cylindrical joint body is provided at the inner peripheral surface thereof with a receiving port into which a one-end pushing portion of a fluid carrying pipe is inserted, and at the outer peripheral surface thereof with a male screw portion. This joint body is formed integrally with the main body of the fluid handling device. Formed at the receiving port is a sealing portion inclined with respect to the axis thereof. A sealing ring having a sealing portion which comes in contact with the sealing portion of the receiving port, is pressingly inserted into one end of the fluid carrying pipe. By the threaded movement of a pushing ring as threadedly connected to a male screw portion on the outer periphery of the joint body, a sealing force is provided to both sealing portions.

4 Claims, 3 Drawing Sheets

FIG. I

PIPE JOINT STRUCTURE FOR FLUID DEVICE

This is a continuation of application Ser. No. 08/180,468 filed on Jan. 12, 1994, which is a continuation application of Ser. No. 07/803,984, filed Dec. 9, 1991 both abandoned.

BACKGROUND OF THE INVENTION

1. Field of the Invention

The present invention relates to a pipe joint structure for connecting a fluid carrying pipe to any of the fluid handling devices such as a variety of valves including stop valves and the like, filters, pumps, flowmeters, tanks and the like.

A pipe joint structure for any of the fluid handling devices mentioned above is strongly required to have such sealing properties as to prevent a fluid flowing inside of a fluid carrying pipe from leaking to the outside thereof even though the fluid temperature undergoes a change. In particular, when such a pipe joint is used for connection of a pipe in a semiconductor manufacturing apparatus or the like in which a medical liquid such as a strong acid or alkali liquid flows, the leakage of such a liquid to the outside, if any, may cause a serious accident. Thus, such a pipe joint is required to present highly reliable sealing properties. Further, the pipe for chemicals in the semiconductor manufacturing apparatus mentioned above is required to have resistance to chemicals, resistance to heat and purity maintaining properties. Accordingly, such a pipe is made of fluoroplastic typically represented by PFA ( a tetrafluoroethylene-perfluoroalkylvinylether copolymer). As compared with a metallic pipe, such a pipe made of fluoroplastic is liable to present a creep phenomenon particularly when heat is applied thereto. Accordingly, when a pipe joint is used for connection of a fluoroplastic pipe used for chemicals in a semiconductor manufacturing apparatus or the like, the pipe joint is required to have such sealing properties as to sufficiently deal with the creep phenomenon.

2. Discussion of the Prior Art

As a pipe joint structure suitable for connection of a pipe for chemicals in the semiconductor manufacturing apparatus as mentioned above, has already been proposed as a resin pipe joint having the arrangement shown in Japanese Utility Model Application No. 1-69378 (Japanese Utility Model Laid-Open Publication No. 2-117494). This resin pipe joint is arranged as shown in FIG. 4. More specifically, a fluid handling device body 30 such as a stop valve or the like is made of fluoroplastic excellent in resistance to chemicals and resistance to heat, such as PFA (a tetrafluoroethylene-perfluoroalkylvinylether copolymer) or PTFE (polytetrafluoroethylene), and a fluid passage 30A inside of the fluid handling device body 30 is provided at an end thereof with a tapering female screw portion 31 for connection. A joint body 33 is provided at one end thereof with a male screw portion 32 to be threadedly connected to the female screw portion 31, and at the other end thereof with a receiving port 37 into which is inserted a one-end pushing portion 36 of a fluid carrying pipe 35 made of PFA ( a tetrafluoroethylene-perfluoroalkylvinylether copolymer). Likewise the fluid handling device body 30, the joint body 33 is made of fluoroplastic excellent in resistance to chemicals and resistance to heat such as PFA (a tetrafluoroethylene-perfluoroalkylvinylether copolymer), PTFE (polytetrafluoroethylene). The joint body 33 is connected to the fluid handling device body 30 through the female and male screw portions 31, 32. An inner ring 34 serving as a sealing ring is pressingly inserted into the one-end pushing portion 36 of the fluid carrying pipe 35 to increase the same in diameter. A pushing ring 40 has a female screw portion 39 to be threadedly connected to a male screw portion 38 formed on the outer periphery of the joint body 33. Primary and secondary sealing portions 41, 42 are respectively formed at the inner part and inlet part of the receiving port 37, as inclined in the direction of the axis thereof. Sealing portions 43, 44 are respectively formed at the inner- and outer-end portions of the inner ring 34 such that these sealing portions 43, 44 respectively correspond to the primary and secondary sealing portion 41, 42. When the one-end pushing portion 36 is inserted into the receiving port 37 of the joint body 33, and the pushing ring 40 is threadedly moved, the joint body 33 is connected to the fluid carrying pipe 35 with a sealing force applied between the primary sealing portion 41 and the inner-end sealing portion 43, and between the secondary sealing portion 42 and the outer-end sealing portion 44.

According to the resin pipe joint having the arrangement shown in FIG. 4, the threaded movement of the pushing ring 40 can produce a strong sealing force between the sealing portions 41, 42 formed at the receiving port 37 of the joint body 33 and the sealing portions 43, 44 formed at the inner ring 34 pressingly inserted into the one-end pushing portion 36 of the fluid carrying pipe 35. Accordingly, this pipe joint restrains stress relaxation due to temperature variations, thus assuring excellent sealing properties between the joint body 33 and the fluid carrying pipe 35 in spite of variations of the fluid temperature. Further, the use of the inner ring 34 advantageously maintains the fluid carrying pipe 35 such that the fluid carrying pipe 35 is prevented from coming off from the joint body 33.

In the pipe joint having the arrangement mentioned above, however, the fluid handling device body 30 and the joint body 33 are separately formed and connected to each other through the female and male screw portions 31, 32. It is therefore difficult to prevent the fluid from leaking through the screw connection portions. In particular, when the pipe joint is used for connection of a pipe for chemicals in the semiconductor manufacturing apparatus or the like mentioned above, a chemical fluid such as a strong acid or alkali fluid flowing in the fluid carrying pipe 35 may leak from the screw connection portions, thus causing a serious accident. Further, there is used a pipe made of fluoroplastic excellent in resistance to chemicals, resistance to heat and purity maintaining properties, such as PFA (a tetrafluoroethylene-perfluoroalkylvinylether copolymer) or the like. Accordingly, as compared with the case where a metallic pipe is used, the fluid leakage through the screw connection portions is great and is liable to be further increased due to a creep phenomenon in particular when heat is applied.

The pipe joint having the arrangement above-mentioned has, at the screw connection portions thereof, a step portion A the diameter of which is greater than that of the fluid passage 30A. This step portion A forms a fluid staying portion. Accordingly, the purity of the fluid is liable to undergo a change when the fluid passes through this portion A. Thus, this pipe joint is not suitable for a pipe joint for a fluid device using a fluid of which high purity is required, such as a chemical fluid flowing in a pipe in a semiconductor manufacturing apparatus or the like as mentioned earlier. That is, such a pipe joint is restricted in use to a narrow range of applications.

SUMMARY OF THE INVENTION

In view of the foregoing, the present invention has as a main object providing a pipe joint structure for a fluid handling device, which has a strong force for preventing the pipe from coming out from the pipe joint, which assures excellent sealing properties in spite of variations of the fluid temperature, which prevents the fluid from changing in purity due to the stay of the fluid, thus assuring a wide range of application to a pipe for chemicals in a semiconductor manufacturing apparatus or the like, and which is improved in workability for connection.

It is another object of the present invention to provide a pipe joint structure having a uniform passage section throughout the length thereof, thus assuring a smooth flow of the fluid.

It is a further object of the present invention to provide a pipe joint structure which is improved in its sealing properties.

To achieve the main object above-mentioned, the present invention provides a pipe joint structure comprising:

a fluid handling device body;

a cylindrical joint body provided at the inner peripheral surface thereof with a receiving port into which a one-end pushing portion of a fluid carrying pipe is inserted, and at the outer peripheral surface thereof with a male screw portion, the joint body being formed integrally with the fluid handling device body;

a sealing portion formed at the receiving port of the joint body as inclined with respect to the axis thereof;

a sealing ring having a sealing portion which comes in contact with the first-mentioned sealing portion; and a pushing ring threadedly connectable to the male screw portion on the outer periphery of the joint body, the pushing ring being adapted to give a sealing force to both sealing portions when the pushing ring is threadedly moved.

According to the pipe joint structure having the arrangement mentioned above, when the one-end pushing portion of the fluid carrying pipe to which the sealing ring is fitted, is inserted into the receiving port of the joint body and the pushing ring is moved as threadedly connected to the screw portion on the outer periphery of the joint body, a strong sealing force is generated between the sealing portion formed at the receiving port of the joint body and the sealing portion of the sealing ring. This can restrain stress relaxation due to variations of the fluid temperature, so that a seal between the joint body and the fluid carrying pipe can be maintained satisfactorily. Further, neither screw connection portions nor step portions are formed between the fluid handling device body and the joint body. This perfectly prevents the fluid from leaking between the fluid handling device body and the joint body. Also, this forms no fluid stay portions. Accordingly, there is no likelihood that the joint body comes off as conventionally done, and the fluid can flow smoothly, thus eliminating inconvenience s of purity variations and the like. Accordingly, the present pipe joint structure can be effectively used as a pipe joint for a fluid handling device where there flows a fluid required not only to be highly intercepted and also to present a high purity, such as a chemical liquid which flows in a semiconductor manufacturing apparatus or the like. Thus, the present pipe joint structure may be used in a wide range of applications.

According to the present invention, the sealing ring in the pipe joint structure may be an inner ring the inner diameter of which is the same as that of the fluid carrying pipe and that of a fluid passage in the fluid handling device so that the fluid is not prevented from flowing smoothly, and which is pressingly inserted into one end of the fluid carrying pipe to increase the same in diameter. This inner ring may be respectively provided at the inner end portion and the outer end portion thereof with an inner-end sealing portion and an outer-end sealing portion which respectively come in contact with the primary and secondary sealing portions, the primary and secondary sealing portions being respectively formed at the inner part and the inlet of the receiving port of the joint body, as inclined with respect to the axis of the receiving port.

The inner ring comprises (i) a fitting portion fittable to the inner part of the receiving port of the joint body, (ii) a pressing insertion portion the diameter of which is smaller than that of the fitting portion by an amount corresponding to the thickness of the fluid pipe, and (iii) an expanding portion which is gradually increased in diameter from the pressing insertion portion to the outside in the axial direction of the inner ring and then gradually decreased in diameter, thus forming a mountain-shape section. The fitting portion, pressing insertion portion and expanding portion are formed in a continuous manner from the inner end of the inner ring toward the outer end thereof in the axial direction thereof.

Preferably, the primary sealing portion of the joint body is inclined with respect to the axis at an angle different from the angle at which the inner-end sealing portion of the inner ring coming in contact with the primary sealing portion, is inclined.

In the pipe joint structure having the arrangement mentioned above, the sealing ring is formed by the inner ring which does not prevent the fluid from flowing smoothly. Accordingly, the section of fluid passage throughout the length of the pipe joint can be made uniform, thus assuring a smooth flow of the fluid. Further, with the threaded movement of the pushing ring, a strong sealing force is generated between the primary sealing portion formed at the inner part of the receiving port of the joint body and the inner-end sealing portion of the inner ring, and between the secondary sealing portion formed at the inlet of the receiving port of the joint body and the outer-end sealing portion of the inner ring. This not only further enhances a seal between the joint body and the fluid carrying pipe, but also restrains stress relaxation due to temperature variations of both sealing portions, thus assuring high sealing properties.

Further, the inner ring has the expanding portion having a mountain-shape section. This not only enhances a seal between the fluid and the inner ring, but also produces a force for preventing the fluid carrying pipe from coming out from the pipe joint body.

Further, when there is a difference in inclined angle with respect to the axis between the primary sealing portion of the joint body and the inner-end sealing portion of the inner ring, a strong sealing force can be concentrated on both sealing portion, thus assuring further improved sealing properties.

According to the present invention, there may be used, as the pushing ring, a ring comprising (i) a cylindrical portion having a female screw portion threadedly connectable to the male screw portion at the outer periphery of the joint body, and (ii) an annular pushing portion which is provided at the inner end of the inner peripheral surface thereof with a pushing edge portion having a diameter substantially equal to the outer diameter of the fluid carrying pipe. With the threaded movement of the pushing ring having the arrangement mentioned above, the sealing ring and the fluid carrying pipe are pushed toward the joint body to cause these members to be integrally connected to one another. Thus, a strong sealing force can be applied between the primary sealing portion and the inner-end sealing portion and between the secondary sealing portion and the outer-end sealing portion.

Other features and effects of the present invention will be apparent from the following description with reference to the attached drawings illustrating embodiments thereof.

DETAILED DESCRIPTION OF THE PREFERRED EMBODIMENTS

Figure 1:
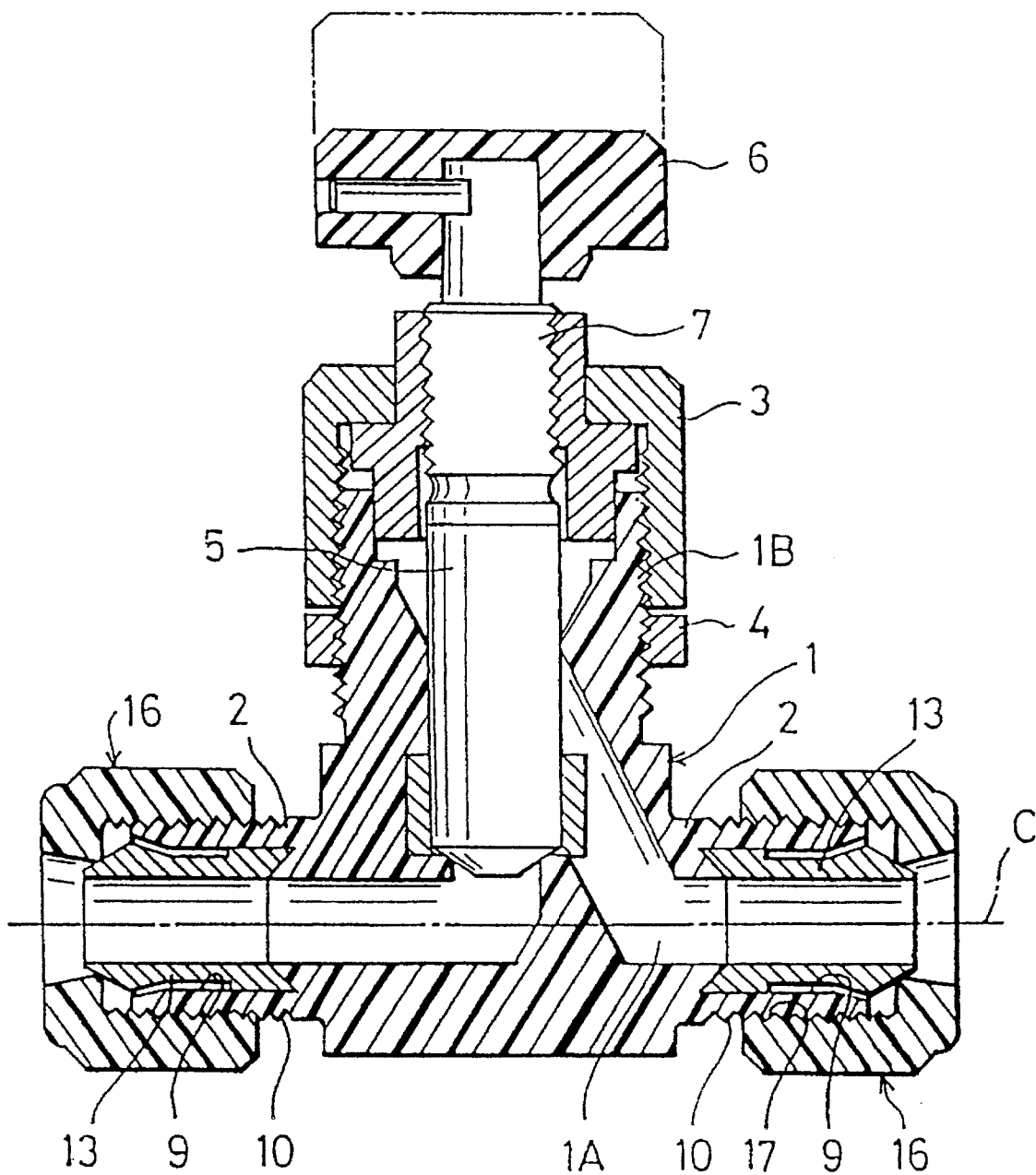
FIG. 1 is a longitudinal section view of a manual stop valve as an example of a fluid handling device to which a pipe joint structure of the present invention is applied.

FIG. 1 shows the arrangement, in longitudinal section, of a manual stop valve as an example of a fluid handling device to which a pipe joint structure of the present invention is applied. In FIG. 1, a valve body 1 is made of fluoroplastic excellent in resistance to chemicals and resistance to heat, such as PTFE (polytetrafluoroethylene), PFA (a tetrafluoroethylene-perfluoroalkylvinylether copolymer) or the like. The valve body 1 integrally has, at both sides thereof, cylindrical joint bodies 2 coaxial with the axis C of an inside fluid passage 1A. The valve body 1 has a center standing portion 1B, to which a shaft-like valve body 5 is supportingly fitted in a vertically movable and openable manner through an outer ring 3 and a pusher ring 4. An opening/closing knob 6 is secured to the upper end of the shaft-like valve body 5 through a lift shaft 7, thus forming a manual stop valve.

Figure 3:
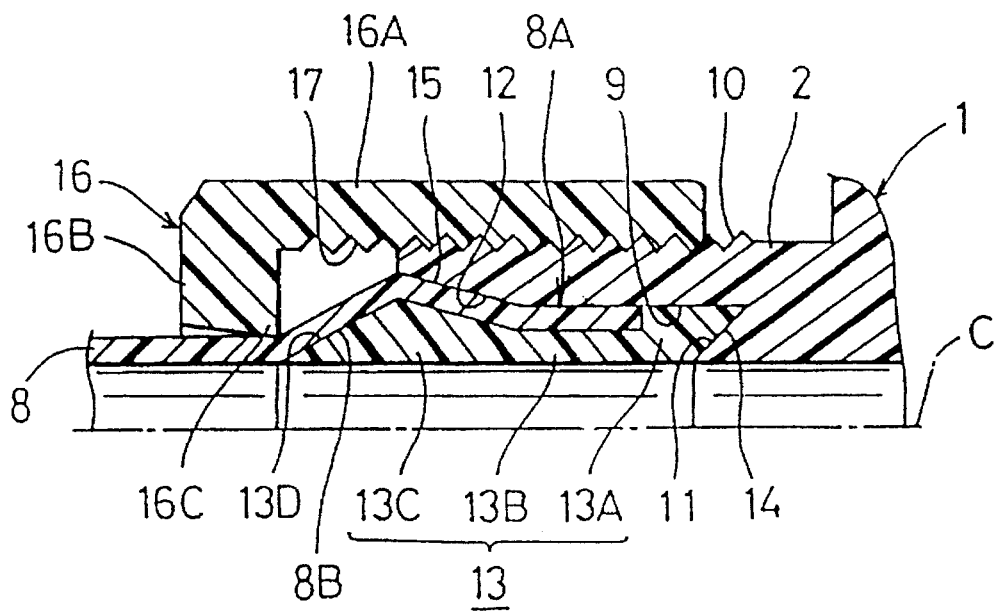
FIG. 3 is an enlarged longitudinal section view of main portions of FIG. 2.
Figure 4:
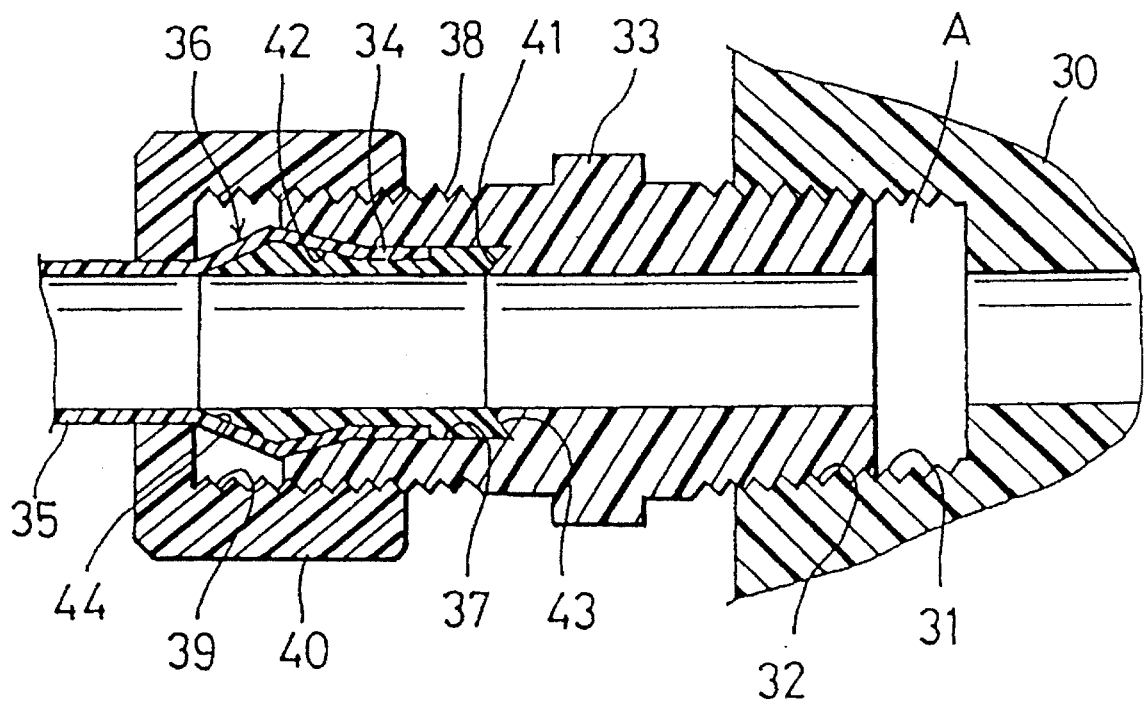
FIG. 4 is a longitudinal section view of a conventional pipe joint structure previously proposed by the applicant.

As shown in FIG. 3, each joint body 2 is provided at the inner peripheral surface thereof with a receiving port 9 into which a one-end pushing portion 8A, to be discussed later, of a fluid carrying pipe 8 is inserted, and at the outer peripheral surface thereof with a male screw portion 10. The receiving port 9 has an inner diameter greater than that of the fluid passage 1A. The receiving port 9 is gradually decreased in inner diameter from the inner part thereof to the outside in the axial direction, thus forming a tapering surface which reaches the inner surface of the fluid passage 1A. Thus, a primary sealing portion 11 is formed at the inner part of the receiving port 9. Also, the receiving port 9 is gradually increased in inner diameter from that portion of the inner surface thereof in the vicinity of the outer end thereof toward the outside in the axial direction, thus forming a tapering surface which reaches the root of the male screw portion 10. Thus, a secondary sealing portion 12 is formed at the inlet of the receiving port 9.

Figure 2:
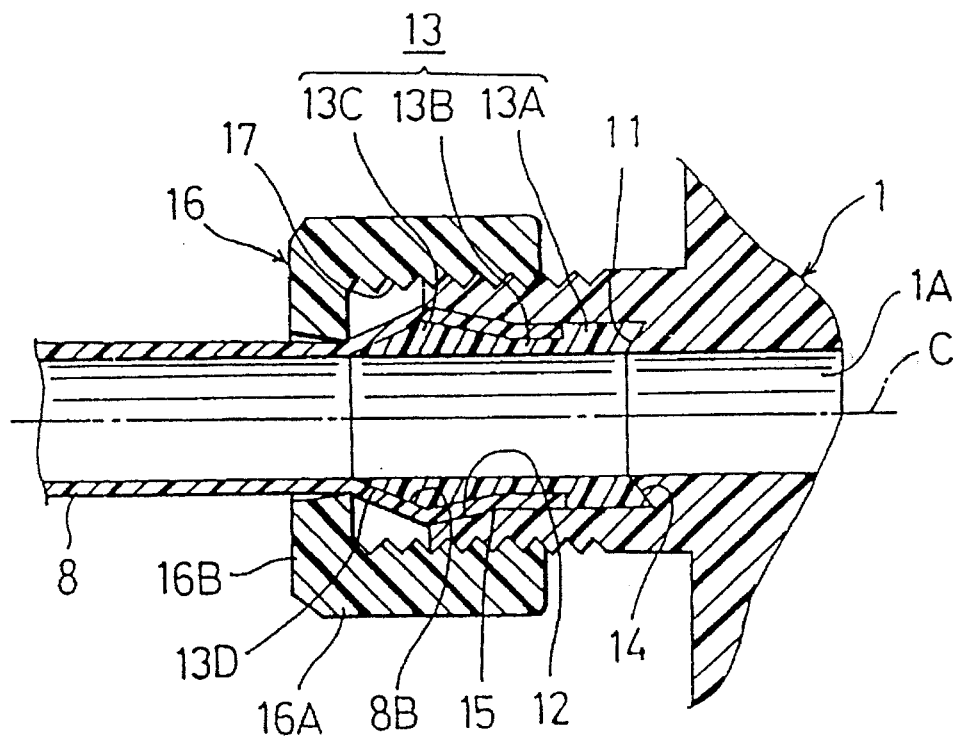
FIG. 2 is a longitudinal section view of main portions of FIG. 1.

In FIG. 2, an inner ring 13 serving as a sealing ring is made of fluoroplastic such as PFA (a tetrafluoroethyleneperfluoroalkylvinylether copolymer) generally in the form of a sleeve. The inner ring 13 integrally has (i) a fitting portion 13A which is formed at the inner end thereof in the axial direction thereof and which is fittable to the inner part of the receiving port 9 of the joint body 2, (ii) a pressing insertion portion 13B the diameter of which diameter is smaller than that of the fitting portion 13A by an amount corresponding to the thickness of the fluid carrying pipe 8, and (iii) an expanding portion 13C which is formed at the axial outer end of the inner ring 13 and which is gradually increased in diameter from the outer end toward the inside in the axial direction and then gradually decreased in diameter, thus forming a mountain-shaped section. In the inner ring 13, the fitting portion 13A is provided at the inner end thereof with an inner-end sealing portion 14 which comes in contact with the primary sealing portion 11 at the inner part of the receiving port 9 of the joint body 2. On the tapering portion which is gradually decreased in diameter from the top of the expanding portion 13C toward the inner end of the inner ring 13, there is formed an outer-end sealing portion 15 which comes in contact with the secondary sealing portion 12 at the inlet of the receiving port 9. The inner diameter of the inner ring 13 is the same as that of the fluid passage 1A in the valve body 1 and the fluid carrying pipe 8, thus assuring smooth flow of a fluid.

As shown in FIG. 3, when the pressing insertion portion 13B and the expanding portion 13C are pressingly inserted into one end of the fluid carrying pipe 8 to increase the diameter of the fluid pipe 8 at the peripheral wall thereof, the inner ring 13 having the arrangement mentioned above is connected to the fluid carrying pipe 8 in such a manner that the inner ring 13 does not come out from the fluid carrying pipe 8. Thus, there is formed the one-end pushing portion 8A which can be inserted into the receiving port 9 of the joint body 2. At this time, a tapering portion 13D which is gradually decreased in diameter from the top of the inner ring 13 toward the outer end thereof, comes in contact with the inner surface of an inclined portion 8B of the fluid carrying pipe 8, thus forming a seal between the fluid carrying pipe 8 and the inner ring 13.

A pushing ring 16 has (i) a cylindrical portion 16A having a female screw portion 17 threadedly connectable to the male screw portion 10 of the joint body 2, and (ii) an annular pushing portion 16B. The annular pushing portion 16B is provided at the inner end of the inner peripheral surface thereof with a pushing edge portion 16C having a diameter substantially equal to the outer diameter of the fluid carrying pipe 8. When the pushing ring 16 having the arrangement mentioned above is threadedly moved inwardly in the direction of the axis C as threadedly connected to the male screw portion 10 of the joint body 2 through the female screw portion 17, the inner ring 13 is pushed toward the joint body 2 and the fluid carrying pipe 8 is pushed toward the joint body 2. Thus, the joint body 2, the inner ring 13 and the fluid carrying pipe 8 are integrally connected to one another, thereby providing a sealing force between the primary sealing portion 11 and the inner-end sealing portion 14, and between the secondary sealing portion 12 and the outer-end sealing portion 15.

The following description will discuss the operation of the structure mentioned above, i.e., how to connect the fluid carrying pipe to the manual stop valve.

First, the pressing insertion portion 13B and the expanding portion 13C of the inner ring 13 are pressingly inserted into one end of the fluid carrying pipe 8 to increase the diameter of the fluid carrying pipe 8 at the peripheral wall thereof. Thus, the fluid carrying pipe 8 is reinforced and the inner ring 13 is integrally connected to the fluid carrying pipe 8 in such a manner that the inner ring 13 does not come out from the fluid carrying pipe 8. Thus, there is formed the one-end pushing portion 8A which can be inserted into the receiving port 9 of the joint body 2. The tapering portion 13D which is gradually decreased in diameter from the top of the inner ring 13 toward the outer end thereof, comes in contact with the inclined portion 8B of the fluid carrying pipe 8, thus forming a seal between the fluid carrying pipe 8 and the inner ring 13.

Then, the one-end pushing portion 8A of the fluid carrying pipe 8 is inserted into the receiving port 9 of the cylindrical joint body 2 integrally formed with the valve body 1. This causes the inner-end sealing portion 14 to come in contact with the primary sealing portion 11, and also causes the outer-end sealing portion 15 to come in contact with the secondary sealing portion 12. In such a state, the female screw portion 17 of the pushing ring 16 previously rotatably put on the fluid carrying pipe 8, is threadedly connected to the male screw portion 10 of the joint body 2 and is fastened as threadedly moved toward the inside in the direction of the axis C. Accordingly, the inner ring 13 and the fluid carrying pipe 8 integrally connected to each other by the pressing insertion mentioned above, are moved inward of the joint body 2, so that the one-end pushing portion 8A of the fluid carrying pipe 8 is held by and between the inner ring 13 and the joint body 2 and that the pushing edge portion 16C of the pushing ring 16 bites a portion of the peripheral surface of the fluid carrying pipe 8. Thus, the fluid carrying pipe 8 is strongly maintained in such manner that the fluid carrying pipe 8 does not come out from the joint body 2.

Further, when the pushing ring 16 is threadedly moved, the inner end portion of the inner ring 13 is pushed toward the joint body 2, so that the primary sealing portion 11 and the secondary sealing portion 12 are respectively pressingly contacted with the inner-end sealing portion 14 and the outer-end sealing portion 15. Thus, a strong sealing force is generated between the primary sealing portion 11 and the inner-end sealing portion 14, and between the secondary sealing portion 12 and the outer-end sealing portion 15. Accordingly, the fluid carrying pipe 8 is highly reliably sealed at both outer and inner peripheral surfaces thereof. This restrains, to the utmost, a decrease in sealing properties due to stress relaxation regardless of variations of the fluid temperature, thus assuring excellent sealing properties for a long period of time.

In the state of connection mentioned above, the valve body 1 and the joint body 2 are integrally formed, so that no screw connection portions are present therebetween. This eliminates a step portion where the fluid stays. Accordingly, no fluid leaks from the integral unit of the valve body 1 and joint body 2, and there is no likelihood that the joint body comes off as conventionally done. Further, there are assured such passage characteristics as to let the fluid flow smoothly without any stay. This eliminates troubles such as decrease in purity of a fluid such as a chemical fluid required to be highly pure.

In the embodiment mentioned above, the inner-end sealing portion 14 of the inner ring 13 and the primary sealing portion 11 of the joint body 2 are inclined at the same angle with respect to the axis C. However, the inner-end sealing portion 14 and the primary sealing portion 11 may be inclined at an angle of about 45° C. and an angle of about 40°, respectively, with respect to the axis C, and both sealing portions 14, 11 may be pressingly contacted with each other by a pushing force accompanied by the threaded movement of the pushing ring 16. In this case, a strong sealing force is concentrated onto the sealing portions 14, 11 at the inner peripheral sides thereof, thus further assuring high sealing properties. The inclination angle with respect to the axis C is preferably in a range from 30° to 80° for the sealing portion 14, and in a range from 25° to 75° for the sealing portion 11. It is therefore suitable that the inclination angle of the sealing portion 14 is equal to the inclination angle of the sealing portion 11 or that the inclination angle of the sealing portion 14 is slightly greater than the inclination angle of the sealing portion 11 as mentioned above.

In the embodiment mentioned above, the description has been made of the structure that the valve body 1 and the joint body 2 are made, in a unitary structure, of resin excellent in resistance to chemicals and resistance to heat. However, the valve body 1 may be made of metal and the joint body 2 may be made, by cutting, in a unitary structure with the valve body 1.

What is claimed is:

1. A pipe joint structure which is used for connection of a pipe in a semiconductor manufacturing process or for a fluid handling device for handling a strong acid or strong alkali fluid, comprising:

a fluid handling device body defining a fluid passage;

means, not in said fluid passage, for controlling fluid flow through said fluid passage;

at least one cylindrical joint body defining an elongated axis and provided at the inner peripheral surface thereof with a receiving port into which one-end pushing portion of a fluid carrying pipe is inserted, and at the outer peripheral surface thereof with a male screw threaded portion, said at least one cylindrical joint body being formed integrally with said fluid handling device body;

a primary sealing portion formed at an inner part of said receiving port and a secondary sealing portion formed at the inlet of said receiving port, said primary sealing portion and said secondary sealing portion being inclined with respect to the axis defined by said at least one cylindrical joint body;

an inner ring having an inner-end sealing portion which comes in contact with said primary sealing portion; and a pushing ring threadedly connected to said male screw threaded portion on the outer periphery of said joint body, said pushing ring including means adapted to provide a sealing force to both said sealing portions when said pushing ring is threadedly moved, wherein:

said inner ring has an inner diameter which is the same as that of the fluid carrying pipe and that of the fluid passage in the fluid handling device so that the fluid flows smoothly, and which is pressingly inserted into one end of the fluid carrying pipe, to thereby increase the diameter of the one-end pushing portion of the fluid carrying pipe, said inner ring is provided with an outer-end sealing portion which produces contact with said secondary sealing portion, said pushing ring comprises (i) a cylindrical portion having a female screw portion threadedly connectable to the male screw portion at the outer periphery of the joint body, and (ii) an annular pushing portion defining said sealing force means and having an inner peripheral surface inclined with respect to said axis for defining an inner end and which is provided at the inner end of the inner peripheral surface with a pushing edge portion having a diameter substantially equal to the outer diameter of the fluid carrying pipe;

said primary sealing portion and said inner-end sealing portion when in contact being mutually inclined with respect to the axis defined by said at least one cylindrical joint body, and said fluid handling device body, said at least one cylindrical joint body, said inner ring and said pushing ring are made of fluoroplastic.

2. A pipe joint structure according to claim 1, wherein said inner ring comprises: (i) a fitting portion fittable to the inner part of said receiving port, (ii) a pressing insertion portion the diameter of which is smaller than that of said fitting portion by an amount corresponding to the thickness of the fluid carrying pipe, and (iii) an expanding portion which is gradually increased in diameter from said pressing insertion portion toward the outside of the axis of said inner ring and then gradually decreased in diameter, thus forming a mountain-shaped section, said fitting portion, said pressing insertion portion and said expanding portion being formed in a continuous manner from the inner end of said inner ring toward the outer end thereof in the axial direction thereof.

3. A pipe joint structure according to claim 2, wherein the fluid device body and the joint body are made of PFA resin (a tetrafluoroethylene-perfluoroalkylvinylether copolymer) or PTFE resin (polytetrafluoroethylene), and the fluid carrying pipe, the sealing ring and the pushing ring are made of PFA resin (a tetrafluoroethylene-perfluoroalkylvinylether copolymer).

4. A pipe joint structure according to claim 1, wherein the fluid device body and the joint body are made of PFA resin (a tetrafluoroethylene-perfluoroalkylvinylether copolymer) or PTFE resin (polytetrafluoroethylene), and the fluid pipe, the sealing ring and the pushing ring are made of PFA resin (a tetrafluoroethylene-perfluoroalkylvinylether copolymer).

* * * * *